US012561389B2

(12) United States Patent
    Ziv et al.

(10) Patent No.: US 12,561,389 B2
(45) Date of Patent: Feb. 24, 2026

(54) ON-DEVICE ARTIFICIAL INTELLIGENCE PROCESSING IN-BROWSER

(71) Applicant: Microsoft Technology Licensing, LLC, Redmond, WA (US)

(72) Inventors: Ori Ziv, Herzliya (IL); Barak Kinarti, Kfar Saba (IL); Ben Bakhar, Tel Aviv (IL); Zvi Figov, Modiin (IL); Fardau Van Neerden, Gelderland (NL); Ohad Jassin, Tel Mond (IL); Avi Neeman, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/807,880

(22) Filed: Jun. 21, 2022

(65) Prior Publication Data

US 2023/0409654 A1    Dec. 21, 2023

(51) Int. Cl.
    *G06F 16/954* (2019.01)
    *G06F 16/23* (2019.01)
    *G06F 16/2455* (2019.01)
    *G06F 16/951* (2019.01)
    *G06F 16/957* (2019.01)

(52) U.S. Cl.
    CPC ........ *G06F 16/954* (2019.01); *G06F 16/2322* (2019.01); *G06F 16/2456* (2019.01); *G06F 16/951* (2019.01); *G06F 16/957* (2019.01)

(58) Field of Classification Search
    CPC ...... G06N 3/04; A01C 21/007; A61B 5/7475; G06F 16/2322; G06F 16/2456; G06F 8/35
    See application file for complete search history.

(56) References Cited

U.S. PATENT DOCUMENTS

| | | | | |
|---|---|---|---|---|
| 2018/0052898 | A1* | 2/2018 | Allan | ................. G06F 16/2322 |
| 2019/0279101 | A1* | 9/2019 | Habti | ................. G06F 16/2456 |
| 2020/0210521 | A1 | 7/2020 | Hutchins | |
| 2021/0334629 | A1 | 10/2021 | Yuan et al. | |
| 2022/0004914 | A1* | 1/2022 | Kirchner | ................. G06F 8/35 |
| 2022/0036302 | A1* | 2/2022 | Cella | ................. G06Q 10/0834 |
| 2022/0183571 | A1* | 6/2022 | Johnson | ............... A61B 5/7475 |

(Continued)

FOREIGN PATENT DOCUMENTS

WO    2020209951 A1    10/2020

OTHER PUBLICATIONS

Detry, Thomas, "Can we really run AI in the browser?", Retrieved from: https://towardsdatascience.com/can-we-really-run-ai-in-the-browser-aaf8a5c17d0, May 13, 2020, 6 Pages.

(Continued)

*Primary Examiner* — Barbara B Anyan

(57) ABSTRACT

Examples of the present disclosure describe systems and methods for on-device, in-browser AI processing. In examples, a selection of an AI pipeline is received. Content associated with the AI pipeline is also received. The content is segmented into multiple data segments and a set of data features is generated for the data segments. AI modules associated with the AI pipeline are loaded to create the AI pipeline. The set of data features is provided to the AI pipeline. The AI pipeline is executed to generate insights for the set of data features. The insights are then provided to a user.

20 Claims, 10 Drawing Sheets

(56)          References Cited

U.S. PATENT DOCUMENTS

| | | | |
|---|---|---|---|
| 2022/0295691 A1* | 9/2022 | Barhai | ................. A01C 21/007 |
| 2022/0301666 A1* | 9/2022 | Shluzas | .................... G06N 3/04 |

OTHER PUBLICATIONS

Kobielus, James, "How now, smart browser? AI takes up residence on the web client", Retrieved from: https://siliconangle.com/2018/05/04/now-smart-browser-ai-takes-residence-web-browser/, May 4, 2018, 3 Pages.

Laborde, Gant, "Avoid Nightmares—NSFW JS", Retrieved from: https://shift.infinite.red/avoid-nightmares-nsfw-js-ab7b176978b1, Feb. 20, 2019, 10 Pages.

Parmar, Suraj, "Machine Learning in the Browser using TensorFlow.js", Retrieved from: https://becominghuman.ai/machine-learning-in-the-browser-using-tensorflow-js-3e453ef2c68c, Mar. 17, 2019, 9 Pages.

Sajjad, Zain, "AI in browsers: Comparing TensorFlow, ONNX, and WebDNN for image classification", Retrieved from: https://blog.logrocket.com/ai-in-browsers-comparing-tensorflow-onnx-and-webdnn-for-image-classification/, Dec. 6, 2019, 6 Pages.

"International Search Report and Written Opinion Issued in PCT Application No. PCT/US23/022528", Mailed Date: Aug. 18, 2023, 18 Pages.

\* cited by examiner

400

Start

Receive Content in Web Browser — 402

Extract Set of Data Features from Content — 404

Select Set of AI Modules Associated with Content — 406

Create AI Pipeline Using Set of AI Modules — 408

Provide Set of Data Features to AI Pipeline — 410

Execute AI Pipeline to Create Insights — 412

Provide Insights in Web Browser — 414

End

500

Start

Receive Insight Objective at Web Browser          502

Evaluating Schema Using Insight Objective to Identify Set of AI Modules          504

Provide Visualization of AI Pipeline Comprising Set of AI Modules          506

Receive Modification to Visualization Causing Update of AI Pipeline          508

End

900

ON-DEVICE ARTIFICIAL INTELLIGENCE PROCESSING IN-BROWSER

BACKGROUND

Delivering artificial intelligence (AI) at scale, while being cost-efficient, is becoming an increasingly complex challenge. Currently, AI models run on servers and require computation powers that are paid for in the cloud. As content providers continue to improve the user experience through AI, the number of AI skills and AI models needed to facilitate such improvement increases. As a result, the cost of running AI models on the servers continues to increase.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for on-device, in-browser AI processing. In examples, a selection of an AI pipeline is received. Content associated with the AI pipeline is also received. The content is segmented into multiple data segments and a set of data features is generated for the data segments. AI modules associated with the AI pipeline are loaded to create the AI pipeline. The set of data features is provided to the AI pipeline. The AI pipeline is executed to generate insights for the set of data features. The insights are then provided to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
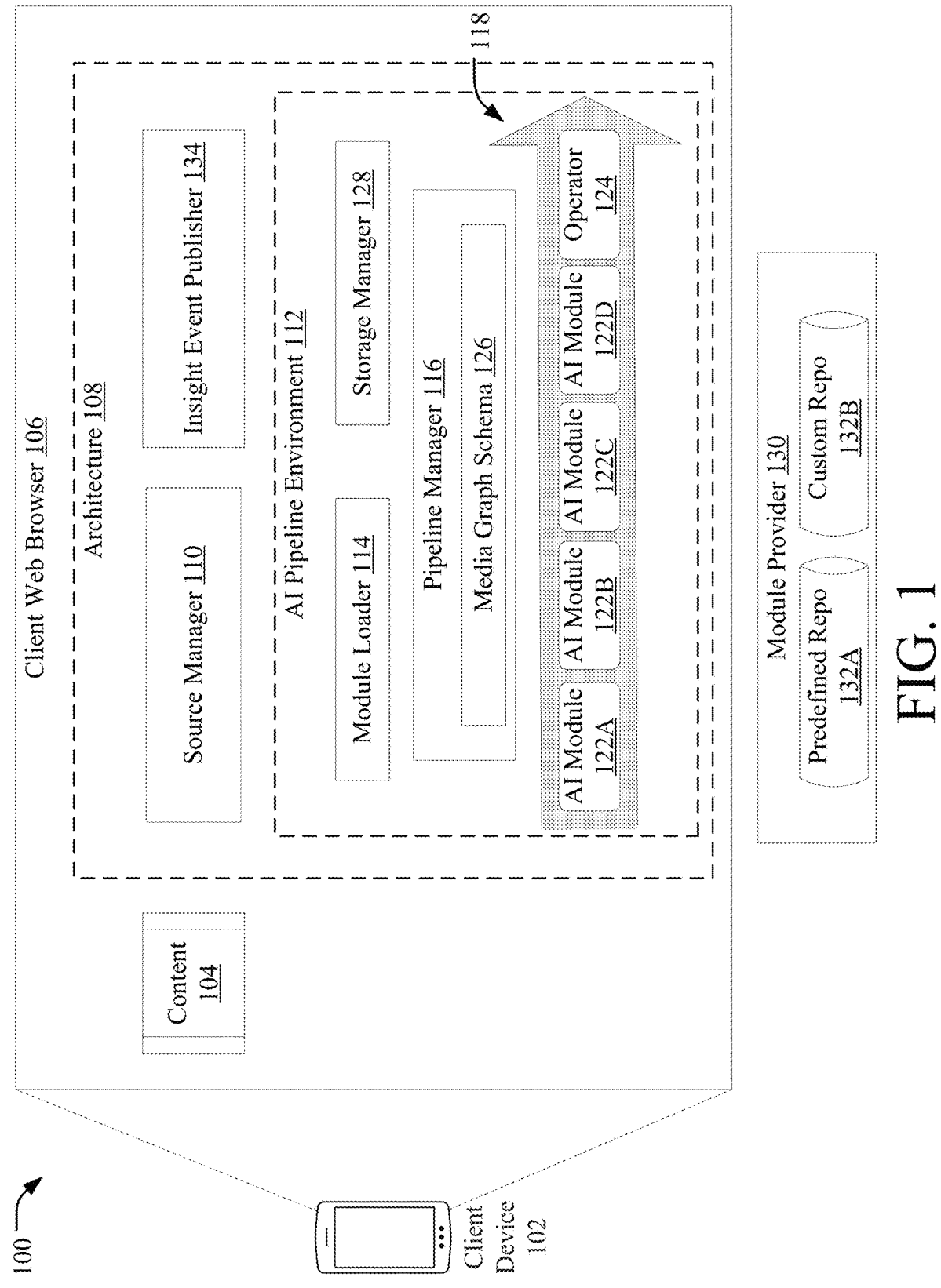
FIG. 1 illustrates an overview of an example computing environment for on-device, in-browser AI processing.

Delivering AI at scale across various products and platforms presents increasingly complex challenges. One of the primary challenges is that most AI models run on server-based or cloud-based computing environments. The computing costs (e.g., costs associated with hardware, bandwidth, CPU usage, storage, licenses) in such environments are often extremely high, especially at larger scales. As the complexity and usage of AI increases, the associated computing costs in these environments also increase. Although recent advancements in technology have seen improvements to hardware capabilities of client devices, executing AI on client devices presents complex challenges, such as client compatibility issues and decreased (with respect server-based or cloud-based computing environments) AI model performance, user experience, and data security.

Accordingly, the present disclosure describes systems and methods for on-device, in-browser AI processing. In examples, a client device implements a client web browser that provides a user interface (UI) enabling access to a web portal for AI pipeline creation by a user. An AI pipeline, as used herein, refers to a set of one or more AI modules that are arranged such that the output of one AI module is used as input for another AI module. An AI module, as used herein, refers to a container comprising software code or instructions for performing a task. The web portal enables the user to specify an insight objective that indicates the type of analysis to be performed by the AI pipeline and the type of insights to be provided for the content. Based on the insight objective, an AI pipeline is selected in accordance with a schema associated with the insight objective and visualized to the user. The web portal enables the user to edit the selected AI pipeline using the visualization. For example, the user may modify the AI modules, the AI module arrangement, or perform preprocessing or postprocessing steps.

After an AI pipeline has been selected and/or modified, the user provides content to be processed by the AI pipeline to the client web browser. The content may include video data, audio data, image data, textual data, or the like. The client web browser separates the content into the different types of data streams (e.g., audio data and video data) within the content. Each of the data streams is segmented into multiple data segments. For example, audio content data is segmented into audio data segments and video content data is segmented into video data segments. A set of data features is generated for the data segments. The client web browser loads and arranges the AI modules associated with the AI pipeline to create the AI pipeline. The set of data features is provided to the AI pipeline. The AI pipeline is executed to generate insights for the set of data features. Insights, as used herein, refers to facts or information of relevance in content. Examples of insights include transcripts, optical character recognition (OCR) elements, objects, faces, topics, keywords, blocks, and similar details. The insights are provided to the user via the UI or another interface provided by the client web browser.

Thus, the present disclosure provides a plurality of technical benefits and improvements over previous AI processing solutions. These technical benefits and improvements include: a client-side framework for in-browser AI processing that enables improved client-side performance and data privacy, a client browser provided UI for creating an AI pipeline of AI modules, an AI pipeline that provides improved insight generation surfacing, and an AI pipeline visualization mechanism for visualizing a graph of the AI pipeline (e.g., a dependency graph or other graphical structure) and modifying the AI pipeline or components thereof, among other examples.

FIG. 1 illustrates an overview of an example computing environment for on-device, in-browser AI processing. Example computing environment 100 as presented is a combination of interdependent components that interact to form an integrated whole. Components of computing environment 100 may be hardware components or software components (e.g., applications, application programming interfaces (APIs), modules, virtual machines, or runtime libraries) implemented on and/or executed by hardware components of computing environment 100. In one example, components of the computing environment disclosed herein are implemented on a single processing device. The processing device may provide an operating environment for software components to execute and utilize resources or facilities of such a system. An example of processing device(s) comprising such an operating environment is depicted in FIGS. 5-9. In another example, the components of systems disclosed herein are distributed across multiple processing devices. For instance, input may be entered on a user device or client device and information may be processed on or accessed from other devices in a network, such as a cloud device or a web server device.

In FIG. 1, computing environment 100 comprises client device 102, which comprises content 104, client web browser 106, and module provider 130. The scale and structure of systems such as computing environment 100 may vary and may include additional or fewer components than those described in FIG. 1. As one example, content 104 and/or module provider 108 may be integrated into client web browser 106.

Client device 102 processes content 104 received from one or more users or client devices. In some examples, content 104 corresponds to user interaction with one or more software applications or services implemented by, or accessible to, client device 102. In other examples, content 104 corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. Content 104 may be comprised in a data file or a live data stream and include voice input, touch input, text-based input, gesture input, video input, and/or image input. Content 104 may be received using one or more sensor components of client device 102. Examples of sensors include microphones, touch-based sensors, geolocation sensors, accelerometers, optical/magnetic sensors, gyroscopes, keyboards, and pointing/selection tools. Examples of client device 102 include personal computers (PCs), mobile devices (e.g., smartphones, tablets, laptops, personal digital assistants (PDAs)), server devices, wearable devices (e.g., smart watches, smart eyewear, fitness trackers, smart clothing, body-mounted devices, head-mounted displays), gaming consoles or devices, and Internet of Things (IoT) devices.

Client web browser 106 is a software program configured to locate, retrieve, and display content items, such as webpages, images, video, and other content items accessible locally on or remotely from client device 102. In examples, client web browser 106 implements architecture 108. Examples of architecture 108 include a framework, software development kit, or hardware/software platform. Architecture 108 enables a user to construct, model, and run AI inferencing in client web browser 106. Architecture 108 provides access to a web portal for creating an AI pipeline. The web portal enables a user to specify an insight objective for which an AI pipeline is to be created. The web portal provides a visualization of the AI pipeline associated with the specified insight objective and enables a user to edit the AI pipeline via the visualization. For example, the visualization may enable a user to modify AI modules, apply operators, select actions to be performed (based on inference outputs), and provide webhooks into specific steps of the AI pipeline. Architecture 108 comprises source manager 110, AI pipeline environment 112, and insight event publisher 134. In examples, client web browser 106 provides received content 104 to source manager 110.

Source manager 110 decodes and extracts data features from content 104. Decoding content 104 comprises applying one or more encoding/decoding mechanisms, such as a video codec or an audio codec, to the corresponding data stream(s) within content 104. A video codec is software that encodes and decodes video data, whereas an audio codec is software that encodes and decodes audio data. Examples of video codecs include H.264 and VP9. Examples of audio codes include AAC and MP3. Source manager 110 extracts data features from each decoded data stream from content 104. Extracting the data features comprises applying techniques, such as principal component analysis (PCA), latent semantic analysis, linear discriminant analysis (LDA), partial least squares, and multifactor dimensionality reduction. Source manager 110 creates a set of data features for each decoded data stream from content 104. For examples, a set of video features may be created and a set of audio features may be created. Source manager 110 provides the set of data features for content 104 to AI pipeline environment 112.

AI pipeline environment 112 is an execution environment for configuring and executing an AI pipeline. AI pipeline environment 112 comprises module loader 114, pipeline manager 116, AI pipeline 118, and storage manager 128. Upon (or prior to) receiving the set of data features for content 104, AI pipeline environment 112 provides the insight objective for AI pipeline 118 (or an indication of the insight objective) to module loader 114.

Module loader 114 identifies and loads a set of AI modules associated with the insight objective. Identifying the set of AI modules may comprise evaluating the insight objective against a schema that maps insight objectives to a set of AI modules. In one example, the schema is accessed via media graph schema 126. Loading the set of AI modules may comprise accessing a repository of AI modules, such as module provider 130, and selecting the set of AI modules from the repository. The selected set of AI modules may represent a subset of the AI modules stored in the repository. Module loader 114 then loads the set of AI modules into AI pipeline environment 112. Loading the set of AI modules may comprise caching the set of AI modules in a memory space of client device 102. Module loader 114 is also configured to arrange the loaded set of AI modules to create the AI pipeline 118. In examples, the set of AI modules is arranged in accordance with the schema for the insight objective.

AI pipeline 118 generates insights for content 104 based on the set of data features for content 104. AI pipeline 118 receives the set of data features for content 104 from module loader 114 or another component of architecture 108, such as pipeline manger 116. AI pipeline 118 processes the set of data features using the AI modules of AI pipeline 118 and outputs one or more insights for the set of data features. AI pipeline 118 may comprise one or more AI modules, such as AI modules 122A-D, each of which represents a step in AI pipeline 118. In some examples, AI pipeline 118 also comprises one or more operators, such as operator 124. Operator 124 may represent a step in AI pipeline 118 and define a processing action, such as applying a condition (e.g., an if-then statement), performing data aggregation or sorting, or performing an associated with the content (e.g., stop content playback, mute content, flag content, delete content).

AI modules 122A-D each comprise software code or instructions for performing a specific task for achieving the insight objective. In examples, the software code or instructions enable topic detection and inferencing, object detection and classification, speech detection and classification, speech-to-text, hashtag and keyword creation, facial recognition, and similar techniques. The software code or instructions may also perform preprocessing or postprocessing steps for an AI module. AI modules 122A-D process the set of data features for content 104 by applying their respective software code or instructions to the set of data features. Based on the processing, each of AI module 122A-D generates an output comprising inference data for the set of data features for content 104. Examples of inference data include timestamps (e.g., for a video frame or an audio sample), a bounding box comprising an object or area, a confidence value for a detected object or detected speech, a keyword or a key phrase, and the like. In some examples, one of AI modules 122A-D, such as the last AI module in AI pipeline 118 (e.g., AI module 122D), uses the inference data from the other AI modules in AI pipeline 118 to create and output insights. For instance, an ML model, such as a neural network or a decision tree, may evaluate the inference data to predict an insight for the inference data. In other examples, each of AI modules 122A-D creates and outputs insights. In yet other examples, a component, such as pipeline manager 116, uses the inference data to create insights. The output of AI module 122A-D may be provided to storage manager 128 and/or to other AI modules in AI pipeline 118.

Pipeline manager 116 orchestrates the steps of AI pipeline 118. Orchestrating the steps of AI pipeline 118 may comprise providing input to the AI modules of AI pipeline 118, collecting output of the AI modules of AI pipeline 118, and performing preprocessing and/or postprocessing for the AI modules and AI pipeline 118. In one example, the postprocessing comprises creating insights using the inference data from AI modules 122A-D. Pipeline manager 116 provides the output of AI pipeline 118 and/or insights created by pipeline manager 116 to insight event publisher 134. Pipeline manager 116 comprises media graph schema 126.

Media graph schema 126 provides a schema or a similar mapping data structure for AI pipeline 118. In examples, media graph schema 126 stores a schema comprising a mapping of insight objectives to sets of AI modules. The schema may indicate a dependency or configuration order for each set of AI modules where the dependency or configuration order defines the order for each step in AI pipeline 118. For instance, each step in the configuration order may correspond to the execution of an AI module in the set of AI modules or to a preprocessing or postprocessing operation of AI pipeline 118.

Storage manager 128 manages storage of the output of the set of AI modules during execution of AI pipeline 118. Storage manager 128 may receive or collect output from AI modules 122A-D after each step of AI pipeline 118, at predetermined time intervals, or after AI Pipeline 118 has completed processing. Storage manager 128 may store the output of the set of AI modules in a data store within or external to client web browser 106.

Module provider 130 provides access to AI modules to be used in AI pipelines. Module provider 130 may store and access the AI modules locally or access the AI modules remotely. In examples, module provider 130 comprises predefined module repository 132A and custom model repository 132B. Predefined module repository 132A stores AI modules that are defined by a developer or service provider of architecture 108. Custom model repository 132B stores AI modules that have been created or modified by the user. For example, an AI module stored in predefined module repository 132A may be moved to custom model repository 132B is response the user modifying some aspect of the AI module (e.g., module name, module functionality, module dependency).

Insight event publisher 134 is publishes insights to the user. Publishing the insights may include providing insights to the web portal or to another interface of client web browser 106 while (or after) content 104 is displayed. In some examples, insight event publisher 134 digitally signs the insights using a digital token or certificate to secure the insights during transmission to the user. In other examples, insight event publisher 134 encrypts the insights using an encryption scheme, such as symmetric key cryptography or public key cryptography.

Figure 2:
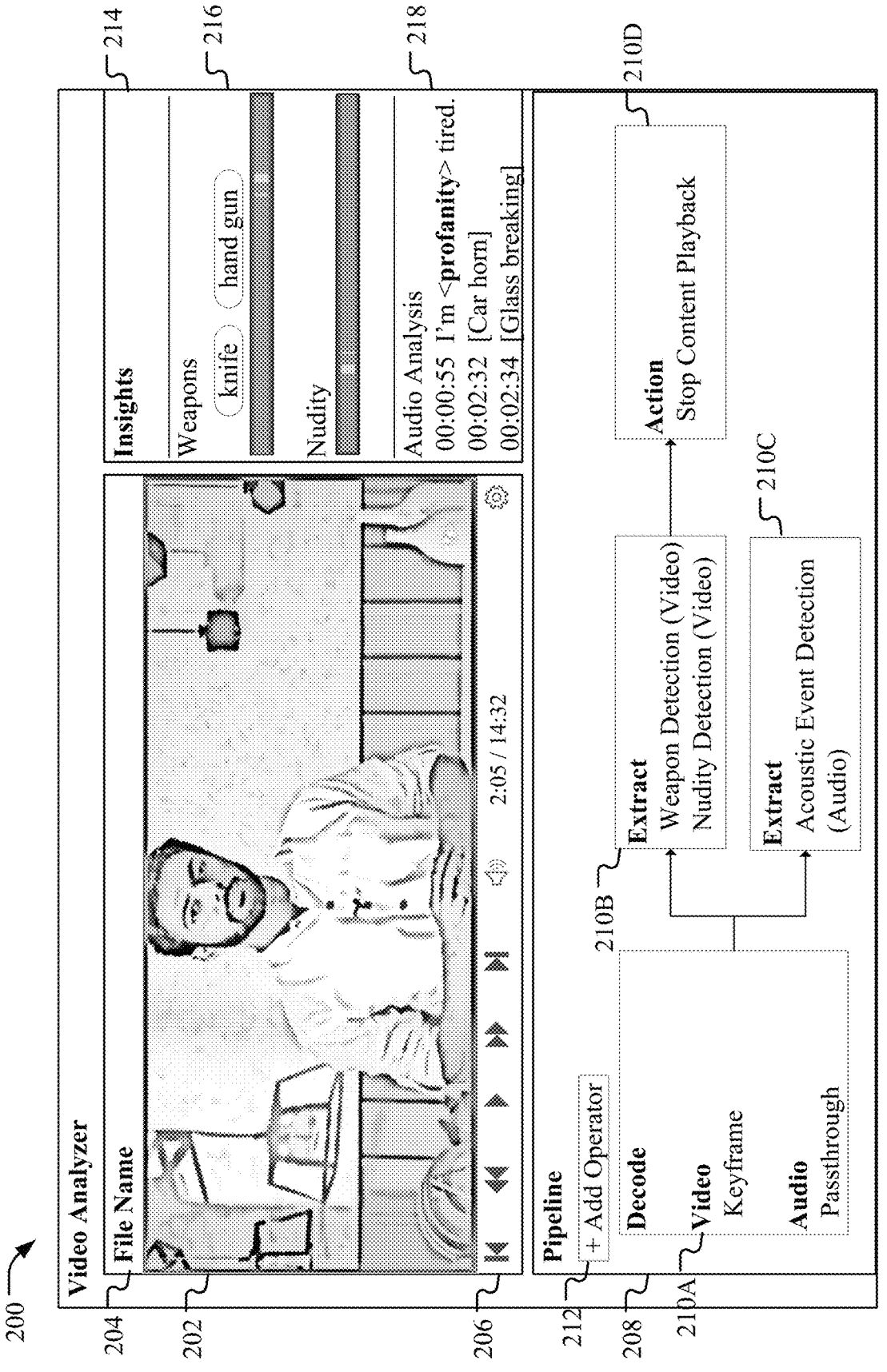
FIG. 2 illustrates an example UI provided by a web portal for executing an AI pipeline using on-device, in-browser AI processing.

FIG. 2 illustrates an example UI provided by a web portal for executing an AI pipeline using on-device, in-browser AI processing. Example UI 200 comprises content section 202, AI pipeline section 208, and Insights section 214. In examples, a user may provide content to UI 200 to be processed using an AI pipeline. The user may select an AI pipeline to be used to analyze the content or the web portal may automatically select an AI pipeline to be used to analyze the content. In examples, the web portal may automatically select an AI pipeline based on factors such as the types of data streams in the content, a title of the content, a content rating (e.g., Mature, Teen, Everyone), and other attributes of the content or the user.

Content section 202 presents content provided to UI 200. Content section 202 comprises title section 204 and content control section 206. Title section 204 provides an area to display a title, subject, or content identifier (e.g., a file name or a data stream identifier) for the content provided to UI 200. Content control section 206 provides a set of media controls to enable interaction with the content. Example interaction includes content playback, content navigation, bookmarking, annotating, configuring settings for the content, and the like.

AI pipeline section 208 provides a visualization of an AI pipeline. AI pipeline section 208 enables a user to visualize and edit the AI pipeline used to analyze the content. AI pipeline section 208 comprises AI modules 210A-D and Add Operator 212. AI modules 210A-D form an AI pipeline, which is visualized in AI pipeline section 208. For example, AI module 210A enables decoding video data and audio data. AI module 210A specifies the type of video data to be decoded (e.g., Keyframes) and the type of audio data to be decoded (e.g., Passthrough). AI module 210B enables detecting and extracting weapons and nudity in the video data. AI module 210C enables detecting and extracting acoustic events in the audio data. AI module 210D enables performing an action if weapons or nudity are detected in the video data (e.g., stop broadcast of content). Add Operator 212 enables a user to add an operator to the AI pipeline.

Editing the AI pipeline may include adding or removing an AI module, an operator, a webhook, a preprocessing or postprocessing step, or modifying an AI module or the dependency or configuration order of an AI module. For example, the AI pipeline section 208 may enable a user to drag/drop AI modules in the visualization of an AI pipeline to effect changes to the AI pipeline. In another example, a user may edit the AI pipeline using Add Operator 212. For instance, the user may choose to add a new operator using Add Operator 212, and Add Operator 212 may add a configurable operator to the AI pipeline visualization. The user may then configure the new operator and arrange the new operator in the AI Pipeline via the visualization. Alternatively, Add Operator 212 may enable the user to configure the new operator and specify the dependencies or configuration order for the new operator from the Add Operator 212 menu.

Insights section 214 provides insights for the content provided to UI 200. In some examples, insights section 214 is populated as the content is played in content section 202 (e.g., in real-time). In other examples, insights section 214 is populated all at once after the content has been processed via the AI pipeline. Insights section 214 comprises video insight section 216 and audio insights section 218. Video insight section 216 presents insights for the video data in the content. For example, video insight section 216 indicates that weapons (e.g., a knife and a hand gun) and nudity were detected in the video data. Audio insight section 218 presents insights for the audio data in the content. For example, audio insight section 218 indicates that specific acoustic events (e.g., profanity, a car horn, and glass breaking) were detected in the audio data.

Figure 3:
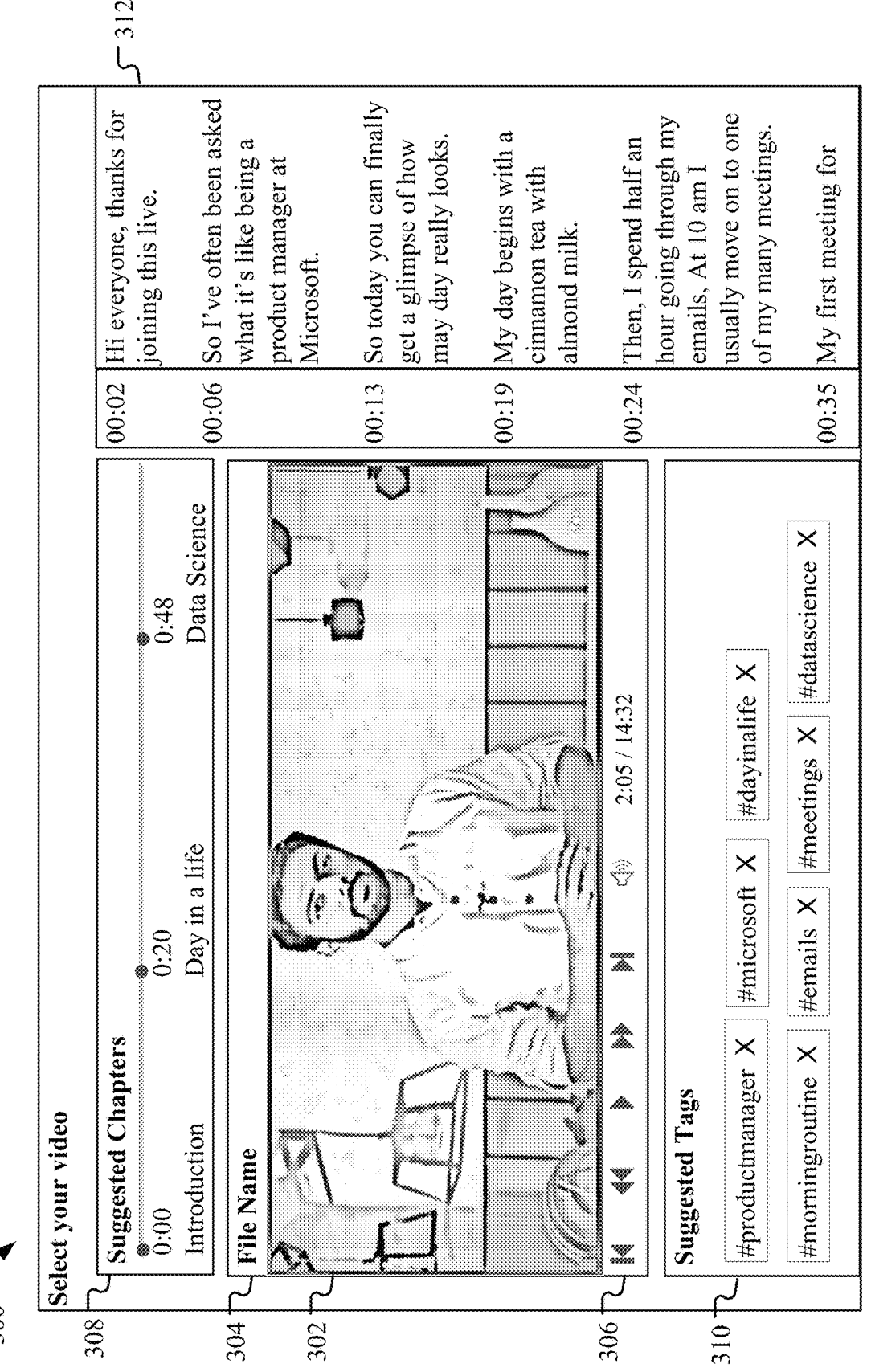
FIG. 3 illustrates an alternative example UI provided by a web portal for executing an AI pipeline using on-device, in-browser AI processing.

FIG. 3 illustrates an alternative example UI provided by a web portal for executing an AI pipeline using on-device, in-browser AI processing. Example UI 300 comprises content section 302 and Insights sections 308, 310, and 312. In examples, a user may provide content to UI 300 to be processed using an AI pipeline. As discussed above in FIG. 200, the AI pipeline may be manually or automatically selected.

Content section 302 presents content provided to UI 300. Content section 302 comprises title section 304 and content control section 306. Title section 304 and content control section 306 are similar in functionality to title section 204 and content control section 206 of FIG. 2.

Insights section 308 provides insights in the form of suggested chapters for the content provided to UI 300. The suggested chapters may be determined using topic inference or detection techniques, such as latent Dirichlet allocation, latent semantic analysis, and correlated topic modeling. In examples, the suggested chapters are displayed along a visual timeline indicating the timestamps at which the topic associated with each suggested chapter was discussed. Insights section 310 provides insights in the form of suggested tags for the content. The suggested tags may be determined using the topic inference or detection techniques discussed above. Insights section 312 provides insights in the form of a transcription of the content. The transcription may be created using automated speech recognition techniques, such as speech-to-text.

Having described one or more systems that may be employed by the aspects disclosed herein, this disclosure will now describe one or more methods that may be performed by various aspects of the disclosure. In aspects, methods 400 and 500 may be performed by a single device or component that integrates the functionality of the components of computing environment 100. However, methods 400 and 500 are not limited to such examples. In other aspects, methods 400 and 500 are performed by one or more components of a distributed network, such as a web service or a cloud service.

Figure 4:
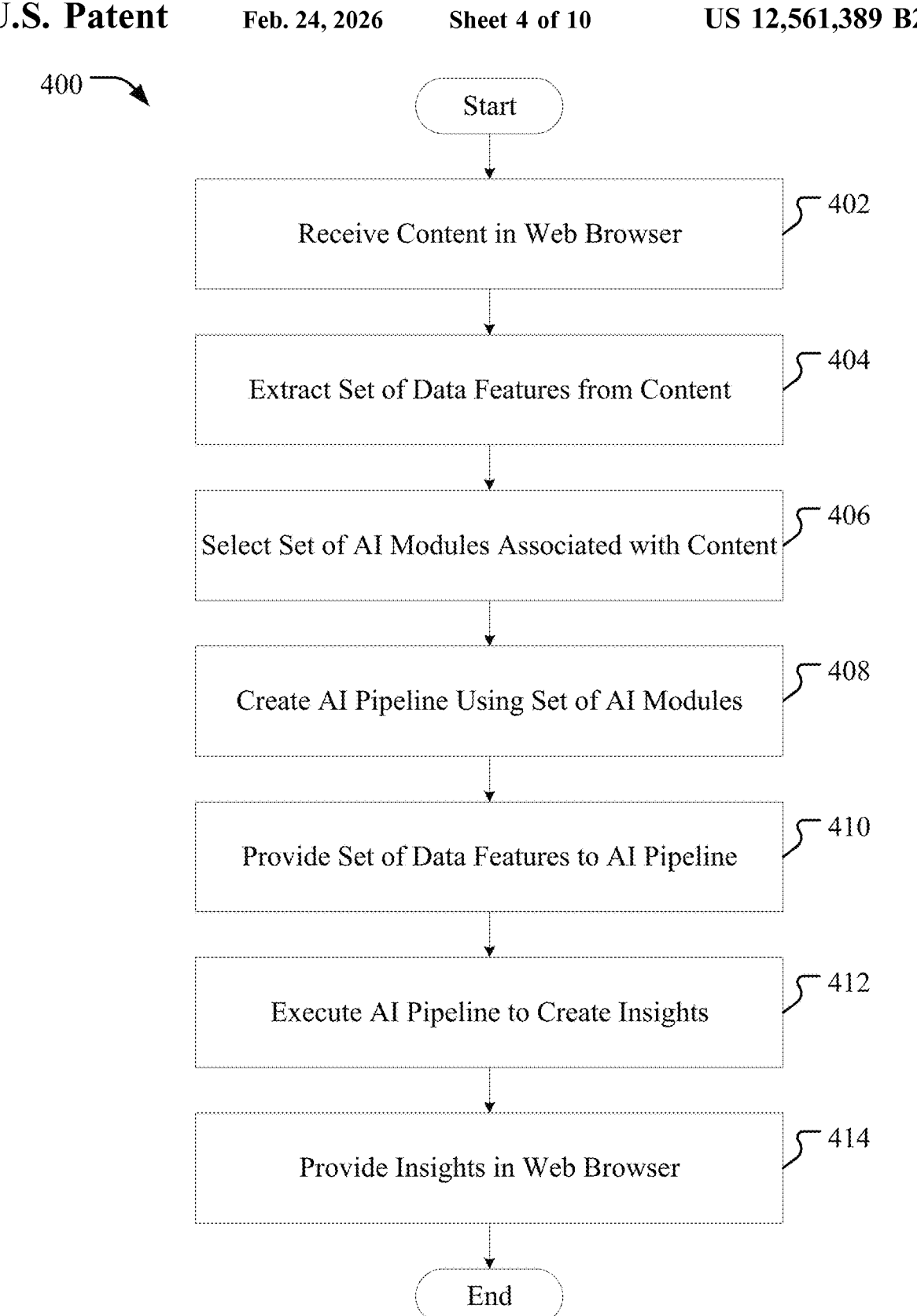
FIG. 4 illustrates an example method for on-device, in-browser AI processing.

FIG. 4 illustrates an example method for on-device, in-browser AI processing. Example method 400 may be executed by a computing device, such as client device 102. Method 400 begins at operation 402, where content is received by a web browser, such as client web browser 106. The content may comprise video data, audio data, image data, textual data, or the like. As a specific example, the content may be a video file comprising video data and audio data. In examples, the web browser implements an architecture that enables a user to construct, model, and run AI inferencing in the web browser, such as architecture 108. The architecture provides access to a web portal that enables a user to specify an insight objective for the content.

At operation 404, a set of data features is extracted from the content. Extracting the set of data features may include applying decoding mechanisms to each data stream in the content. For example, a video codec may be applied to video data in the content and an audio codec may be applied to audio data in the content. The decoding mechanisms may decode each data stream in the content. In examples, a feature extraction component, such as source manager 110, extracts data features from each decoded data stream using an ML feature extraction technique, such as PCA or LDA. For instance, video frames may be extracted from a decoded video data stream and audio segments may be extracted from a decoded audio data stream. The extracted data features form the set data features.

At operation 406, a set of AI modules associated with the content is selected. In examples, the set of AI modules includes at least one AI module and is stored locally by the web browser or accessed via a storage location or device external to the web browser, such as storage manager 128. The set of AI modules may be selected manually of automatically. For example, a user may manually select the set of AI modules based on an insight objective for the content. The insight objective may be selected using a UI provided by the in-browser architecture. For instance, a user may select the insight objective from the UI using a dropdown list, a radial button, or other UI element, or the user may input the insight objective into the UI using a text field or a microphone. The insight objective may be mapped in a schema (or similar mapping data structure) to the set of AI modules. The set of AI modules may be selected based on the mapping. In another example, the set of AI modules are selected automatically by the UI (or another component of the in-browser architecture) based on attributes of the content or attributes of a user associated with the content provided to the web browser (e.g., the content author, the user providing the content to the web browser, the user executing the AI pipeline).

At operation 408, the set of AI modules is used to create an AI pipeline. Creating the AI pipeline comprises loading the set of AI modules in a pipeline execution environment, such as AI pipeline environment 112, and arranging the set of AI modules according to a dependency or configuration order. The dependency or configuration order may be specified by the schema (or similar mapping data structure) associated with the insight objective and the AI pipeline. Each AI module in the set of AI modules represents a step in the AI pipeline and comprises software code or instructions for performing a specific task for achieving the insight objective, such as topic inferencing, object detection, speech classification, etc. In some examples, additional steps are added to the AI pipeline as part of loading and arranging the set of AI modules. For instance, one or more operators, preprocessing steps, or postprocessing steps may be added to the AI pipeline such that dependency or configuration order of the set of AI modules is modified.

At operation 410, the set of data features is provided as input to the AI pipeline. As one example, the feature extraction component provides the set of data features to the pipeline execution environment. A pipeline orchestration component, such as pipeline manager 116, then provides the set of data features to one or more AI modules of the AI pipeline. For instance, the set of data features may be provided to the first AI module in the AI pipeline, which represents the first step of the AI pipeline. In another example, the set of data features may be provided to a preprocessing step (representing the first step of the AI pipeline) prior to being provided to an AI module of the AI pipeline. Examples of preprocessing include resizing a video frame, audio transformations, modifying an image resolution, segmenting or combining audio samples, normalizing data, and the like.

At operation 412, the AI pipeline is executed to create insights. Executing the AI pipeline comprises using the software code or instructions of an AI module, operator, or preprocessing step or postprocessing step to generate an output comprising inference data for the set of data features, such as timestamps, a bounding box or polygon/contour annotation, confidence values for detected objects or acoustic events, topics and keywords, and the like. In some examples, the set of data features and inference data generated by an AI module are provided to the subsequent AI module in the AI pipeline (e.g., the AI module representing the next step in the AI pipeline). The subsequent AI module then uses the set of data features and inference data from the previous AI module to generate inference data. Alternatively, only the set of data features or the inference data generated by previous AI module are provide to the subsequent AI module. In at least one example, the inference data created by each AI module is provided to the pipeline orchestration component or another component of the architecture, such as storage manager 128. The inference data is used to create insights for the set of data features. For example, an ML model of the AI pipeline or the pipeline orchestration component may evaluate the inference data to predict insights for the inference data using a Bayesian inferencing algorithm.

At operation 414, the insights may be provided to an interface of the web browser. In examples, the insights are provided in an interface comprising the content. The insights may be displayed in the interface in real-time as the content is displayed or executed (e.g., played back) in the interface. Alternatively, the insights may be displayed in the interface at or after the conclusion of content being displayed or executed. As one specific example, as a video file is played back using media playback functionality of the interface, insights for the video data of the content, such as the detected presence of weapons and nudity, and insights for the audio data in the content, such as the detected presence of profanity, are provided in the interface. The insights may be provided along with timestamps indicating the time in the playback of the content at which the insight (or inference data associated with the insight) occurs. In such an example, a visualization of the AI pipeline may also be displayed in the interface as the content is played back and the insights are being displayed. As another specific example, as video content is live streamed to the web browser, insights for the live stream are provided in the interface, such as suggested chapters, suggested hashtags, and a transcript. Timestamps may be provided for the transcript and timestamps and topics may be provided for the suggested chapters.

Figure 5:
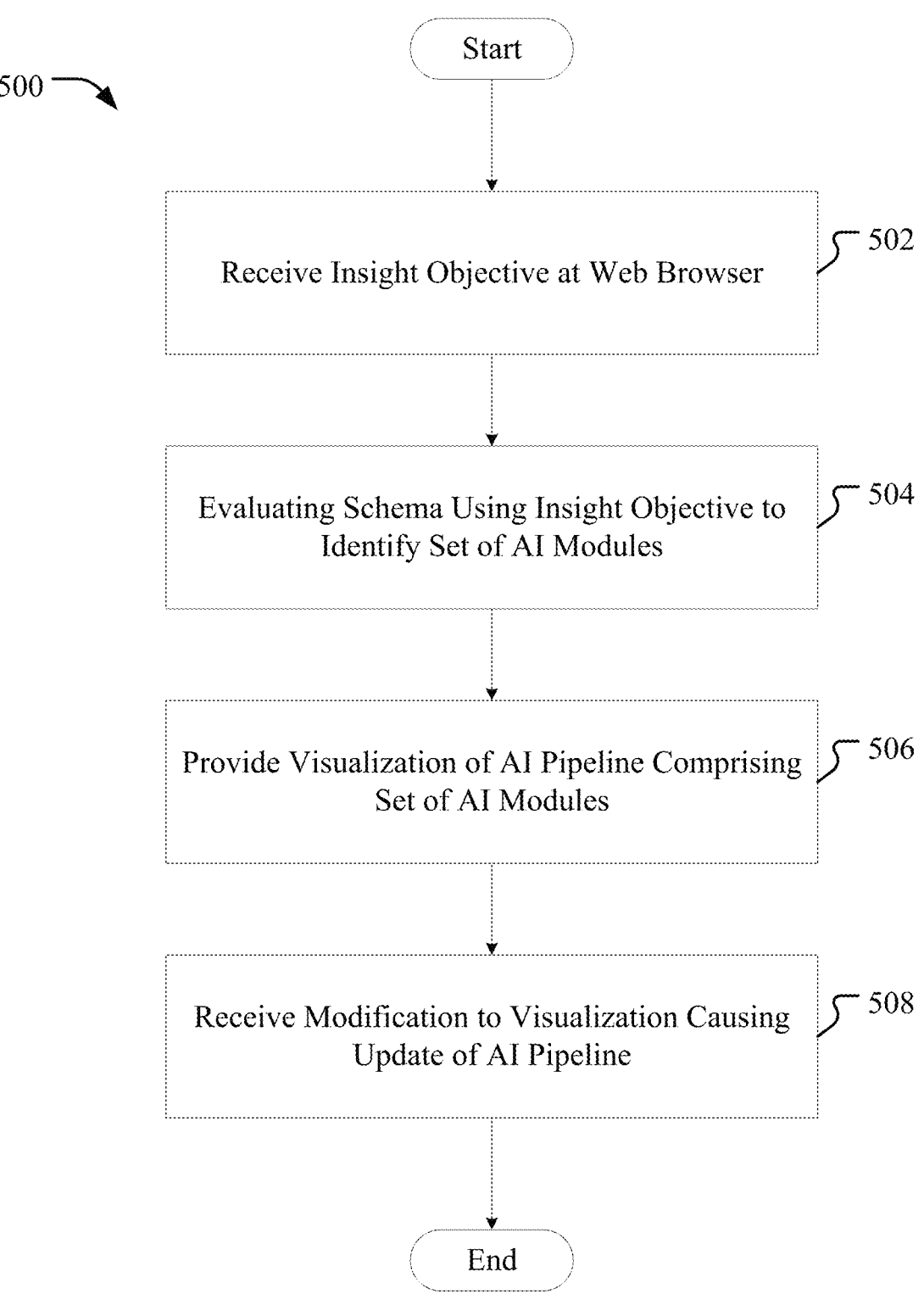
FIG. 5 illustrates an alternative example method for on-device, in-browser AI processing.

FIG. 5 illustrates an alternative example method for on-device, in-browser AI processing. Example method 500 may be executed by a computing device, such as client device 102. Method 500 begins at operation 502, where an insight objective for content to be processed by an AI pipeline is received. In examples, the insight objective is received at a UI provided by a web browser implementing an architecture that enables a user to construct, model, and run AI inferencing in the web browser. A user may select the insight objective from the UI (e.g., via a dropdown list or a radial button) or provide the insight objective to the UI (e.g., via a text field or a microphone). For instance, the user may specify the insight objective "Identify Inappropriate Content."

At operation 504, a schema is evaluated using the insight objective. In examples, the UI automatically evaluates the received insight objective against a schema stored by or accessible to the UI. The schema comprises mappings that correlate (e.g., map) insight objectives to sets of AI modules. The set of AI modules that are correlated to an insight objective are configured to form an AI pipeline for satisfying the insight objective. For example, a schema may correlate the insight objective "Identify Inappropriate Content" to a set of AI modules comprising an AI module for detecting weapons in video data, an AI module for detecting illicit substances in video data, an AI module for detecting profanity in audio data, and an AI module for detecting acoustic events that are indicative of violence in audio data. The UI selects the set of AI modules correlated to the received insight objective. In at least one example, instead of the UI automatically selecting a set of AI modules, the user manually selects the set of AI modules. For instance, the UI may provide a list of available AI modules and the user may select the AI modules that will be used to fulfill the insight objective.

At operation 506, a visualization of the AI pipeline formed by the set of AI modules is provided. In some examples, the schema indicates the dependencies or a configuration order for the set of AI modules. The UI arranges the set of AI modules in accordance with the schema in a visualization of the AI pipeline. Alternatively, the user may manually assign an arrangement to the set of AI modules when selecting the set of AI modules from the UI. The UI then arranges the set of AI modules in a visualization of the AI pipeline in accordance with the manually assigned arrangement. The visualization may be a dependency graph or another type of graphical structure. The UI presents the visualization and a set of controls for interacting with the visualization. In examples, the visualization may be editable such that the user is able to modify the visualization to effect change to the AI pipeline.

At operation 508, a modification to the visualization is received. In examples, the user provides a modification to the visualization, such as adding or removing an AI module, an operator, a webhook, a preprocessing or postprocessing step, or modifying an AI module or the dependency or configuration order of an AI module. The modification may be performed by applying input commands (e.g., drag/drop, copy/paste), menu commands (such as Add Operator 212), voice commands, or any other type of commands to the visualization. As a specific example, the user may use touch input to drag/drop a new AI module into the visualization. The user may then use voice commands to configure the new AI module within the visualization. In response to the modification of the visualization, the modification is applied to the AI pipeline.

Figure 6:
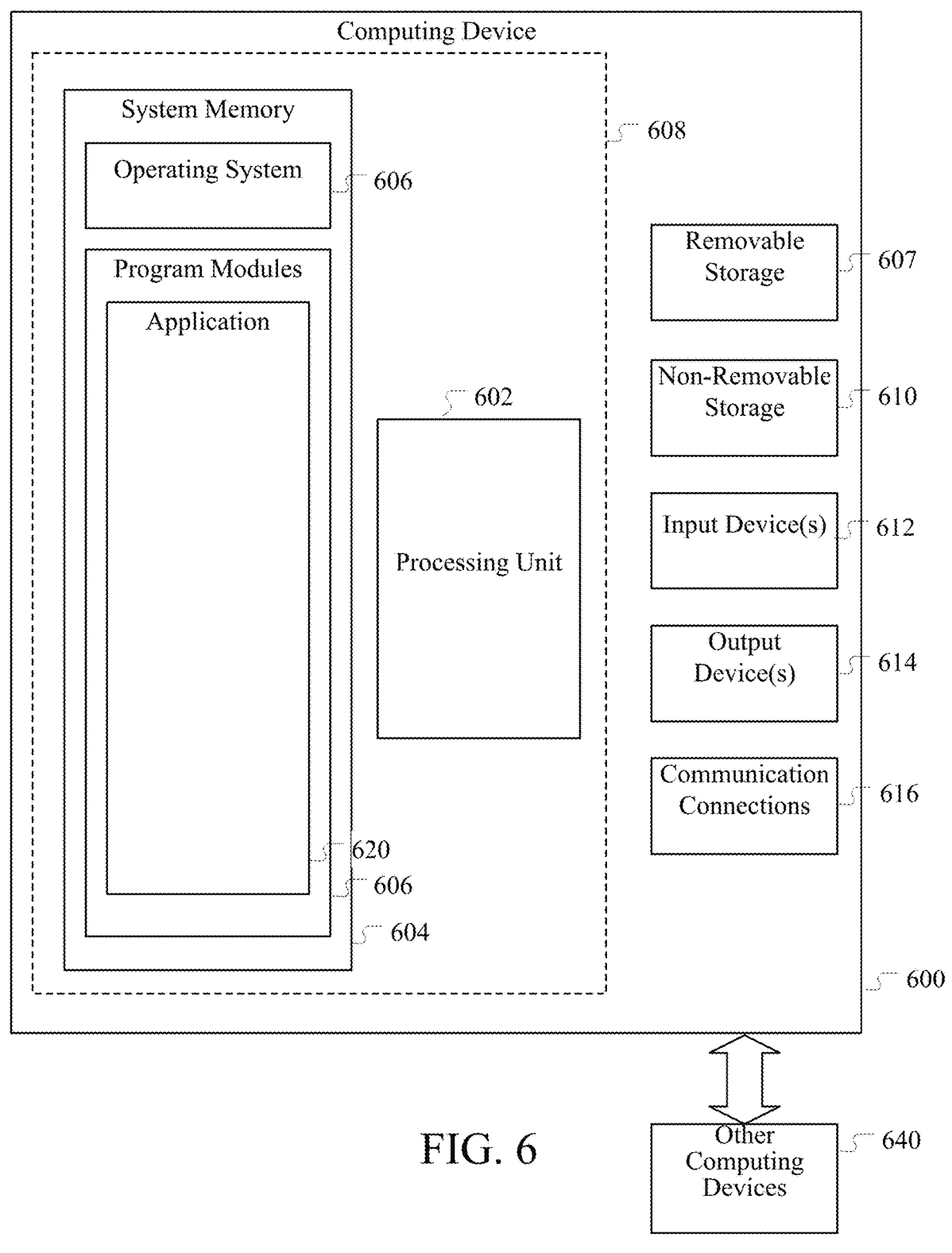
FIG. 6 is a block diagram illustrating example physical components of a computing device for practicing aspects of the disclosure.

FIG. 6 is a block diagram illustrating physical components (e.g., hardware) of a computing device 600 with which aspects of the disclosure may be practiced. The computing device components described below may be suitable for the computing devices and systems described above. In a basic configuration, the computing device 600 includes at least one processing unit 602 and a system memory 604. Depending on the configuration and type of computing device, the system memory 604 may comprise volatile storage (e.g., random access memory), non-volatile storage (e.g., read-only memory), flash memory, or any combination of such memories.

The system memory 604 includes an operating system 605 and one or more program modules 606 suitable for running software application 620, such as one or more components supported by the systems described herein. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may include additional data storage devices (removable and/or non-removable) such as, for example, magnetic disks, optical disks, tape, and other computer readable media. Such additional storage is illustrated in FIG. 6 by a removable storage device 607 and a non-removable storage device 610.

As stated above, a number of program modules and data files may be stored in the system memory 604. While executing on the processing unit 602, the program modules 606 (e.g., application 620) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The term computer readable media as used herein includes computer storage media. Computer storage media includes volatile and nonvolatile, removable and non-removable media implemented in any method or technology for storage of information, such as computer readable instructions, data structures, or program modules. The system memory 604, the removable storage device 607, and the non-removable storage device 610 are all computer storage media examples (e.g., memory storage). Computer storage media includes random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired The computing device 600 may also have one or more input device(s) 612 such as a keyboard, a mouse, a pen, a sound or voice input device, a touch or swipe input device, etc. Output device(s) 614 such as a display, speakers, a printer, etc. may also be included. The aforementioned devices are examples and others may be used. The computing device 600 may include one or more communication connections 616 allowing communications with other computing devices 640. Examples of suitable communication connections 616 include radio frequency (RF) transmitter, receiver, and/or transceiver circuitry; universal serial bus (USB), parallel, and/or serial ports.

Figure 7A:
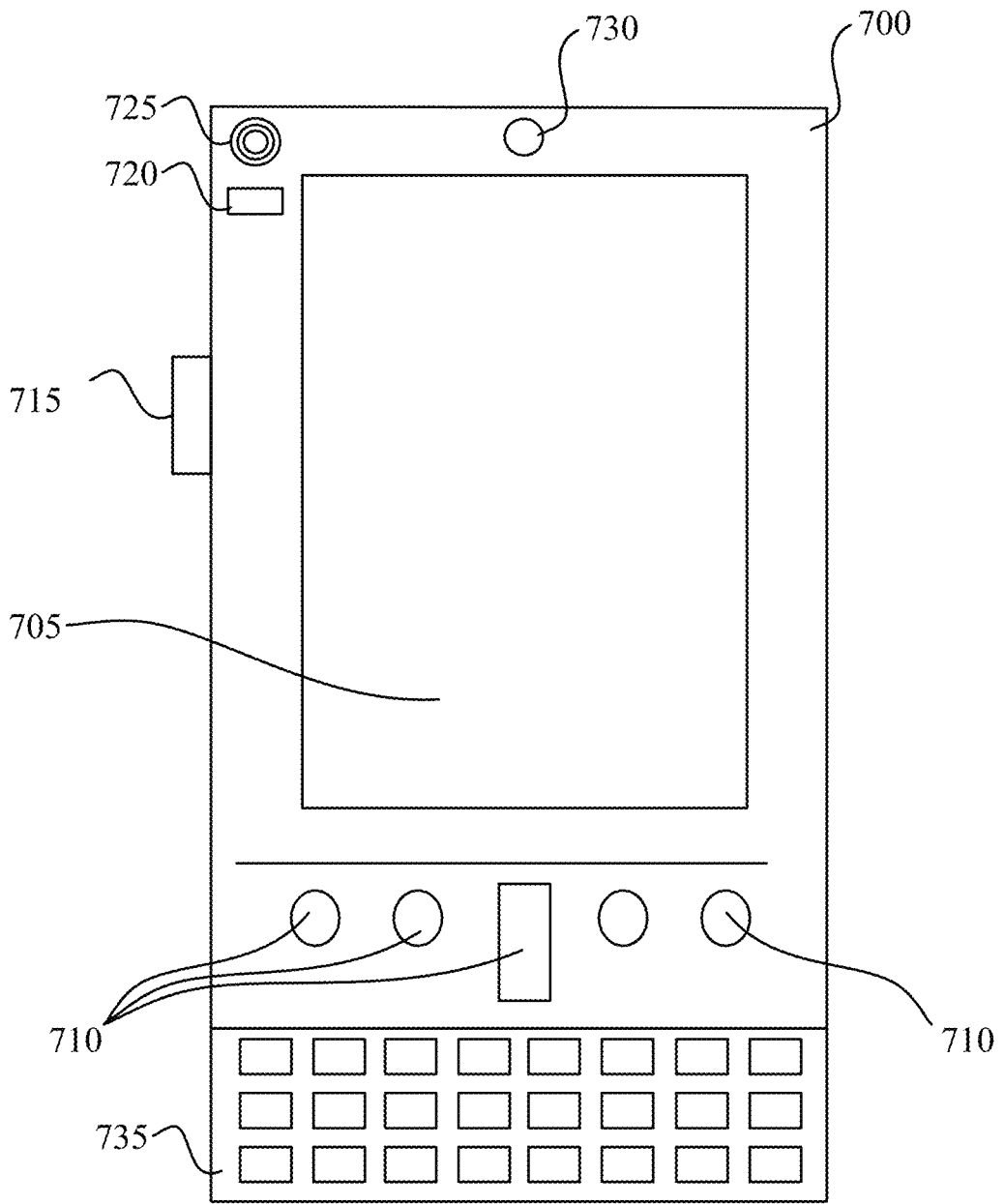
FIGS. 7A and 7B are simplified block diagrams of an example mobile computing device for practicing aspects of the present disclosure.
Figure 7B:
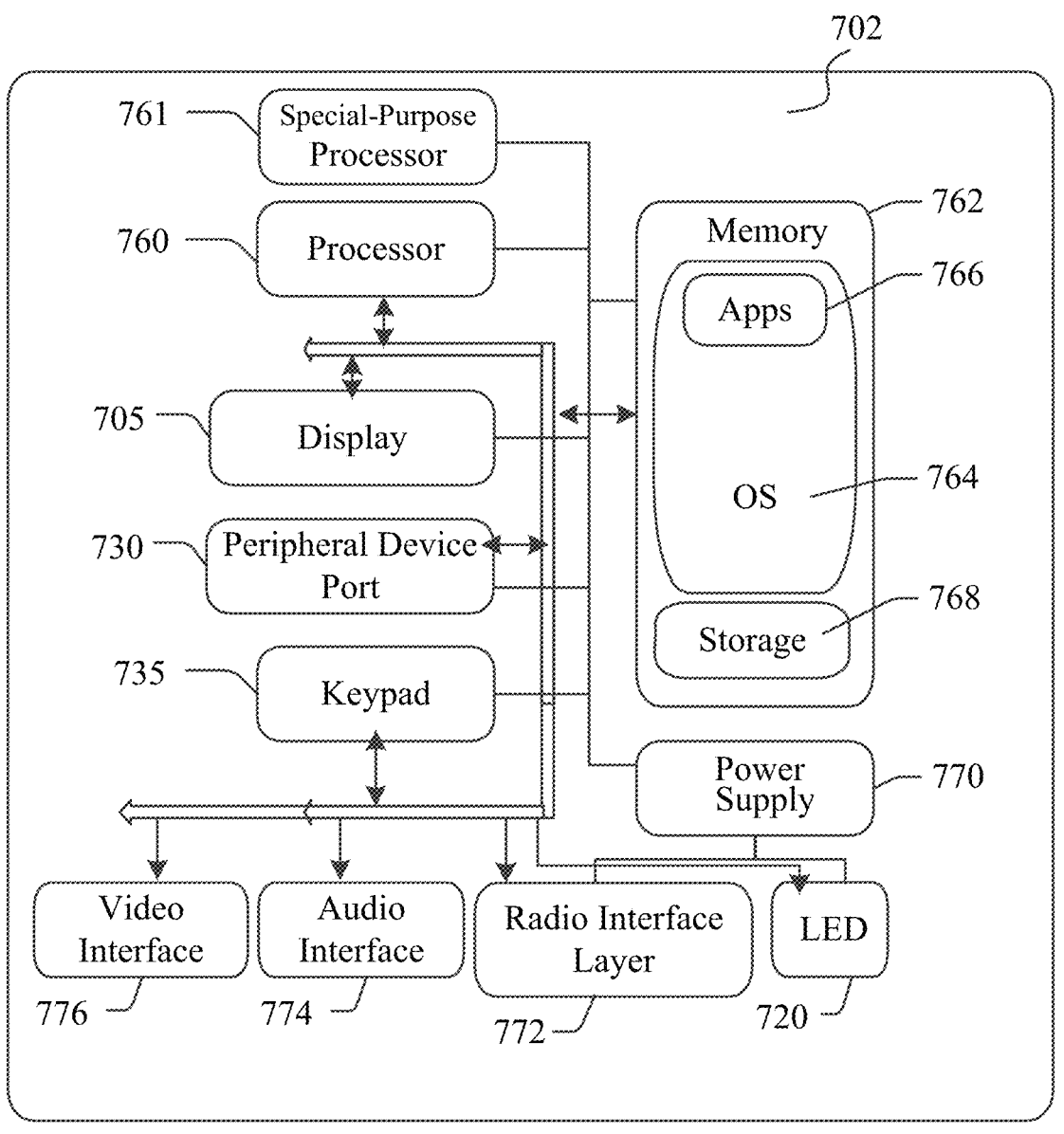

FIGS. 7A and 7B illustrate a mobile computing device 700, for example, a mobile telephone (e.g., a smart phone), wearable computer (such as a smart watch), a tablet computer, a laptop computer, and the like, with which embodiments of the disclosure may be practiced. In some aspects, the client device is a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and may include one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 incorporates more or less input elements. For example, the display 705 may not be a touch screen in some embodiments.

In yet another alternative embodiment, the mobile computing device 700 is a mobile telephone, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system (OS) 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device described herein (e.g., search engine, extractor module, relevancy ranking module, answer scoring module).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the OS 764, and vice versa.

The visual indicator (e.g., light emitting diode (LED) 720) may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor(s) (e.g., processor 760 and/or special-purpose processor 761) and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone also serves as an audio sensor to facilitate control of notifications, as will be described below. The system 702 may further include a video interface 776 that enables an operation of a peripheral device port 730 (e.g., an on-board camera) to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data may be readily transferred between computing devices for storage and use according to well-known data transfer and storage means, including electronic mail and collaboration data sharing systems.

Figure 8:
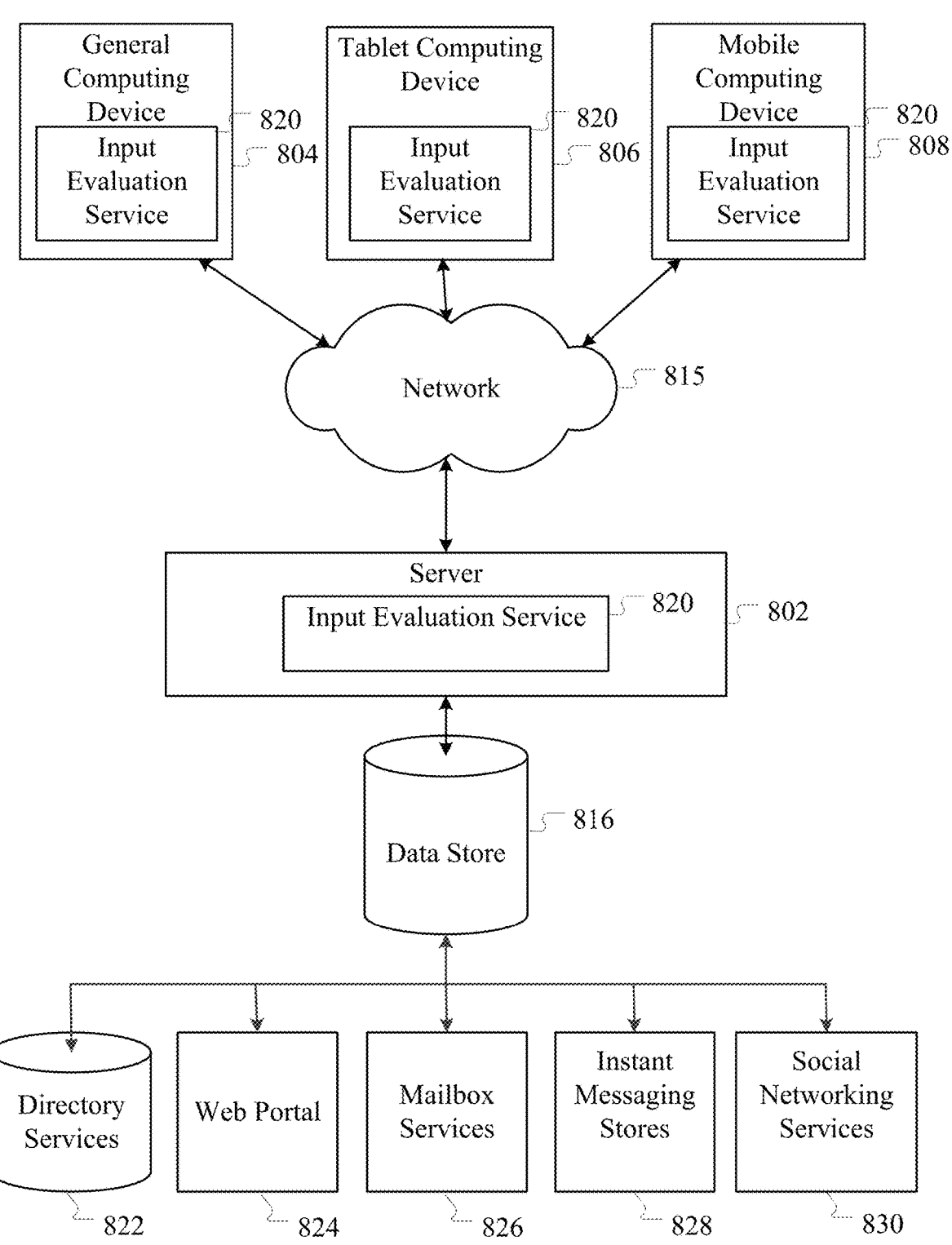
FIG. 8 is a simplified block diagram of an example distributed computing system for practicing aspects of the present disclosure.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using directory services 822, web portals 824, mailbox services 826, instant messaging stores 828, or social networking services 830.

An input evaluation service 820 may be employed by a client that communicates with server device 802, and/or input evaluation service 820 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the data store 816, in addition to receiving graphical data useable to be either pre-processed at a graphic-originating system, or post-processed at a receiving computing system.

Figure 9:
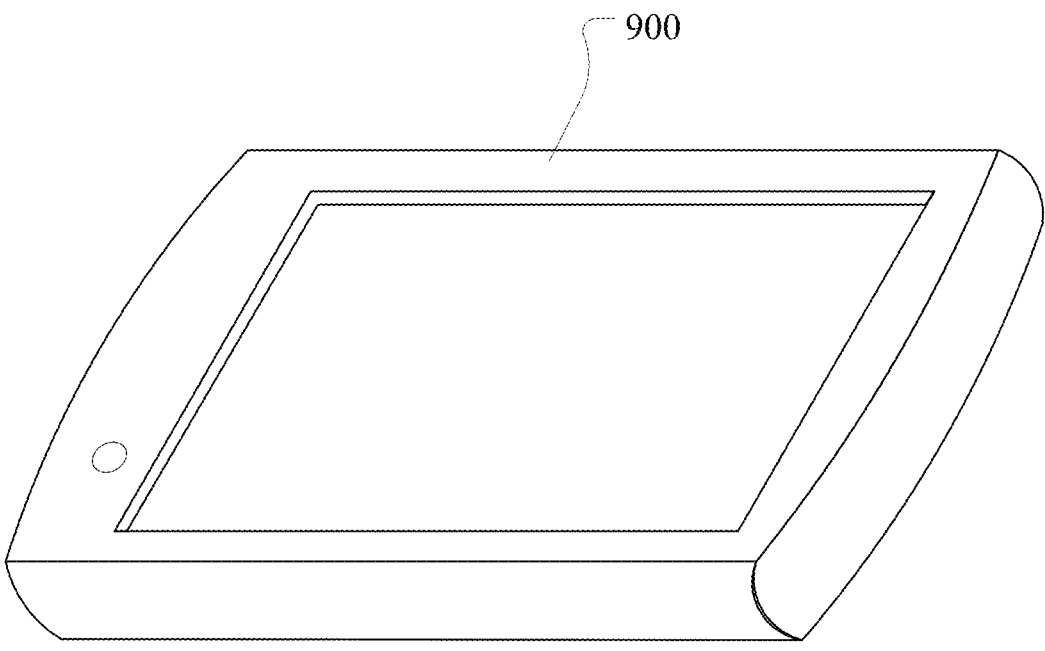
FIG. 9 illustrates an example tablet computing device for executing one or more aspects of the present disclosure.

FIG. 9 illustrates an example of a tablet computing device 900 that may execute one or more aspects disclosed herein. In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor system comprising a processor; and
memory coupled to the processor, the memory comprising computer executable instructions that, when executed by the processor, perform operations comprising:
receiving content by a web browser of a client device, the web browser comprising an in-browser architecture that includes an execution environment for executing an artificial intelligence (AI) pipeline, wherein the content includes at least one of audio content or video content;
extracting, by the in-browser architecture, a set of data features from the content;
retrieving, by the in-browser architecture, a set of AI modules;
creating the AI pipeline in the execution environment using the set of AI modules;
providing the set of data features to the AI pipeline;
executing the AI pipeline in the execution environment to process the content and create a set of insights; and
providing, by the in-browser architecture, the set of insights to an interface of the web browser during receipt or playback of the content.

2. The system of claim 1, wherein extracting the set of data features from the content comprises:
decoding each data stream in the content; and
extracting the set of data features.

3. The system of claim 1, wherein creating the AI pipeline using the set of AI modules comprises:
retrieving the set of AI modules from an AI module repository comprising a plurality of AI modules, the AI module repository being external to the web browser, the set of AI modules representing a subset of the plurality of AI modules.

4. The system of claim 1, wherein selecting the set of AI modules comprises:
receiving a manual selection of the set of AI modules via the web browser.

5. The system of claim 1, wherein selecting the set of AI modules comprises:
evaluating, by the web browser, attributes of the content; and
based on the attributes of the content, selecting, by the web browser, the set of AI modules.

6. The system of claim 1, wherein creating the AI pipeline comprises:
loading the set of AI modules in the execution environment; and
arranging the set of AI modules according to a configuration order, the configuration order defining dependencies for the set of AI modules.

7. The system of claim 1, wherein each AI module in the set of AI modules:
represents a step in the AI pipeline; and
comprises software code or instructions for performing the step.

8. The system of claim 1, wherein a particular AI module in the set of AI modules performs at least one of:
topic inferencing;
object detection; or
speech classification.

9. The system of claim 1, wherein, in addition to the set of AI modules, the AI pipeline further comprises at least one operator, preprocessing step, or postprocessing step.

10. The system of claim 1, wherein executing the AI pipeline causes a particular AI module in the set of AI modules to generate an output comprising inference data for the set of data features.

11. The system of claim 10, wherein the inference data comprises at least one of:

a timestamp for a video frame;

a bounding box; or a confidence value for a detected object or event.

12. A method comprising:

extracting, by a web browser implementing an in-browser architecture, a set of data features from content, wherein:

the web browser is implemented by a user device;

the in-browser architecture comprises an execution environment for executing an artificial intelligence (AI) pipeline; and the content is a video file comprising video data and audio data;

retrieving, by the in-browser architecture, a set of AI modules;

creating the AI pipeline in the execution environment using the set of AI modules;

providing the set of data features to the AI pipeline;

creating a set of insights by executing the AI pipeline in the execution environment; and providing, by the in-browser architecture, the set of insights to the web browser.

13. The method of claim 12, wherein the user device is a mobile device.

14. The method of claim 12, wherein the user device retrieves the set of AI modules from a server environment or a cloud-based environment separate from the user device.

15. The method of claim 12, wherein creating the AI pipeline and creating the set of insights is performed on-device of the user device.

16. The method of claim 12, the method further comprising:

prior to extracting the set of data features from the content:

receiving the content at the web browser, wherein the content is provided by a data source external to the user device.

17. The method of claim 16, the method further comprising:

upon receiving the content at the web browser, receiving an insight objective for the content, wherein the insight objective indicates a type of analysis to be performed by the AI pipeline and one or more types of insights to be provided for the content.

18. The method of claim 12, wherein providing the set of insights to the web browser comprises causing the set of insights to be displayed in in interface of the user device in real-time as the content is displayed in the interface.

19. A user device comprising:

a processor; and memory comprising computer executable instructions that, when executed, perform operations comprising:

receiving content by a web browser of the user device, the web browser comprising an in-browser architecture that includes an execution environment for executing an artificial intelligence (AI) pipeline on-device of the user device, the content being a video file comprising video data and audio data;

extracting, by the in-browser architecture, a set of data features from the content;

retrieving, by the in-browser architecture, a set of AI modules based on the set of data features;

creating the AI pipeline in the execution environment by:

retrieving the set of AI modules from a data source outside of the execution environment; and loading the set of AI modules into the execution environment;

providing the set of data features to the AI pipeline;

creating a set of insights by executing the AI pipeline in the execution environment; and providing, by the in-browser architecture, the set of insights to an interface of the user device such that one or more insights in the set of insights is provided in the interface while at least a portion of the content is provided in the interface.

20. The user device of claim 19, wherein the set of AI modules is retrieved from a server environment or a cloud-based environment separate from the user device.

\* \* \* \* \*